Patented Apr. 25, 1950

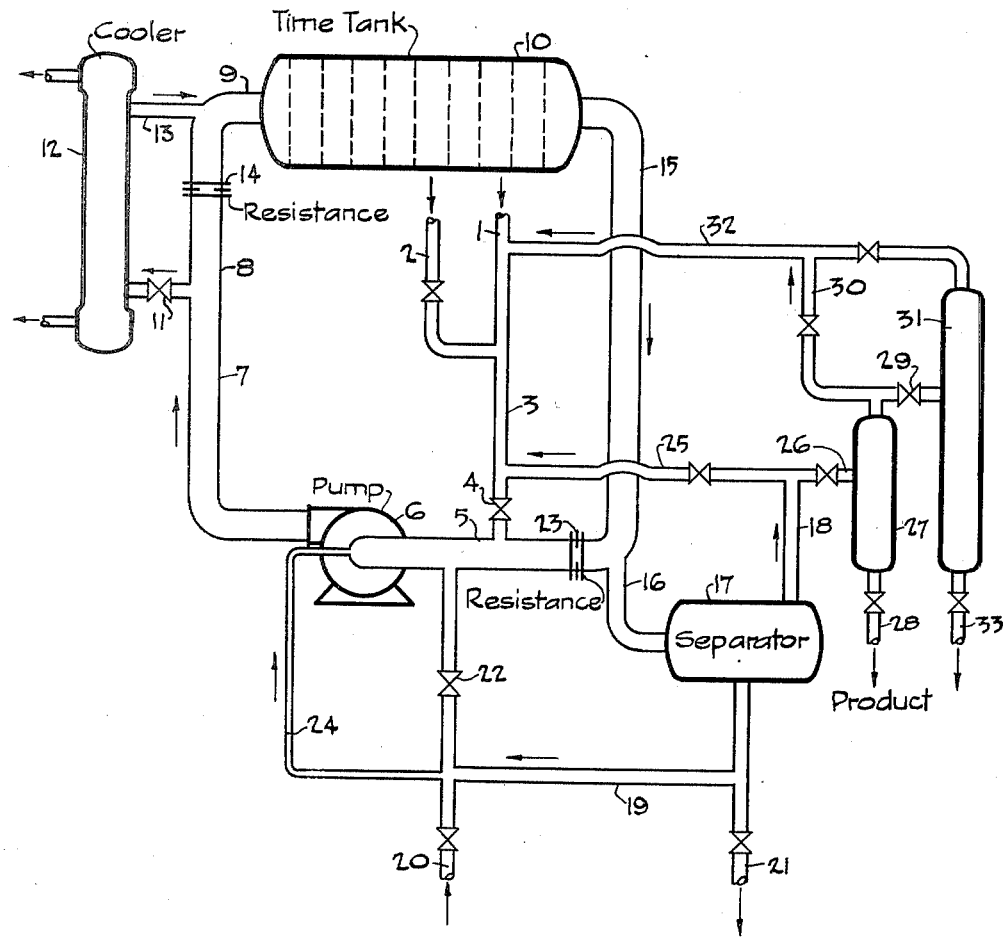

2,505,644

UNITED STATES PATENT OFFICE 2,505,644

PRODUCTION OF MOTOR FUELS BY ALKYLATION

Sumner H. McAllister, Lafayette, and Edwin F. Bullard, Oakland, Calif., assignors to Shell Development Company, San Francisco, Calif., a corporation of Delaware Original application December 14, 1938, Serial No. 245,714. Divided and this application May 24, 1946, Serial No. 671,988

8 Claims. (Cl. 260—683.4)

This invention relates to a low temperature process for reacting isoparaffins with olefins in the liquid phase in the presence of catalyst acid, particularly sulfuric acid, to form higher boiling hydrocarbons. It deals particularly with a new and more efficient method for carrying out such reactions in a continuous manner in which undesirable side reactions may be minimized.

An important object to our invention is the provision of a continuous process for reacting isoparaffins with olefins in which the effective life of the catalyst acid is unusually long and its cost correspondingly low. Another object of the process of our invention is to provide a simple method whereby a high ratio of isoparaffin to olefin may be continuously maintained in the reaction zone and accumulation of olefin in the reactor avoided. Still another object of our invention is to prevent undesirable reactions of the olefin used, especially hydration, esterification and polymerization reactions. A further object of our novel process is to reduce to a minimum the power required for dispersing the reactants in the catalyst acid while insuring complete, uniform and intimate dispersion. It is also an object of our invention to provide a method of operation which makes practical high rates of production per volume of reaction space.

The process of our invention provides an especially advantageous method for reacting lower boiling isoparaffins such as isobutane and isopentane with normally gaseous olefins such as propylene, normal and/or isobutylenes to form paraffins which boil within the gasoline range and have a high anti-knock value. It will be understood, however, that our new reaction method is not limited to these specific reactions but may advantageously be used in the manufacture of other branched chain saturated compounds by reacting saturated aliphatic hydrocarbons having a hydrogen atom attached to a tertiary carbon atom, whether normally gaseous or liquid, such, for example, as 2-methyl pentane, 2,3-dimethyl butane, 2,2,3-trimethyl butane, 3-ethyl pentane, methylcyclopentane, or suitable substitution products thereof such, for example, as monochlorides corresponding thereto or the like, with the same or other olefins. Olefins which may be reacted with such compounds in accordance with the process of our invention include, in addition to propylene and the butylenes, alpha and beta amylene, isopropylethylene, trimethyl ethylene, unsymmetrical methyl ethyl ethylene, isobutyl-ethylene, iso-octylenes, cyclopentene, cyclohexene, butadiene, cyclohexadiene, or the corresponding unsaturated chlorides, and the like. The reactants may be used in a pure state as a mixture of one or more isoparaffins with one or more olefins or as such mixtures containing other components which may or may not be inert under the reaction conditions but which are such that they do not interfere with the desired reaction between the isoparaffin or isoparaffins and the olefin or olefins being reacted. Thus hydrogen, nitrogen, methane, ethane, propane, normal butane, tetramethyl methane, ethylene and the like, for example, may be present. Particularly advantageous sources of isoparaffins and olefins which may be reacted in accordance with the process of our invention are hydrocarbons derived from petroleum, petroleum products, shale oils, coal peat, animal or vegetable oils or like carboniferous materials. The isoparaffins and/or olefins present in the starting material may be of natural occurrence, the result of catalytic dehydrogenation, cracking or other pyrogenetic treatment. Cracked petroleum distillates or special fractions thereof, particularly hydrocarbon fractions consisting of, or predominating in, hydrocarbons containing the same number of carbon atoms per molecule, may be used although non-isomeric mixtures are also suitable. Such hydrocarbon fractions or mixtures may advantageously be subjected to a polymerization treatment prior to their treatment in accordance with the process of the present invention. For example, the mixture may be first treated to interpolymerize tertiary olefins with secondary olefins and the residual hydrocarbon containing isoparaffin and olefins, generally principally secondary olefin or olefins, used as starting material for our process. Copending application Serial No. 133,203 of Sumner H. McAllister, filed March 26, 1937, now United States Patent No. 2,174,247, describes an especially advantageous method for carrying out such a preliminary interpolymerization step. Alternatively, tertiary olefin or olefins may be selectively polymerized in part or substantially quantitatively prior to carrying out the present process with the residual isoparaffin and olefin content. United States Patents Nos. 1,938,177, 2,007,159 and 2,007,160 describe suitable methods for carrying out the preliminary removal of tertiary olefins. Whatever the preliminary polymerization treatment used, the present process may be carried out with the remaining isoparaffin whether or not the olefin polymers are first separated therefrom.

While we do not wish to be limited to any particular theory with respect to the present invention, the following explanation of the process of our invention will assist in making clear its method of operation and in explaining the highly advantageous results attained. The isoparaffin is considered as the less reactive molecule and the olefin as the more reactive molecule involved in the process of our invention. In the presence of an acid catalyst, such as sulfuric acid of at least 90% concentration or its equivalent, the olefin can be made to react with the isoparaffin. The reaction may be considered as taking place in the acid phase. The olefin can also readily react with the acid to form mono- or di-sulfates or alcohols or ethers or with other molecules of the same or other olefins if present to form co- or interpolymers. These side reactions, particularly those of the olefin with the acid are undesirable not only because they reduce the yield of isoparaffin reaction products but also because they very seriously impair the life of the catalyst. Relatively small amounts of olefin are capable of leading to rapid deterioration of the acid catalyst. Olefins are absorbed by catalyst acids at enormously faster rates than are isoparaffins. For example, the rates of absorption of alpha and beta butylenes in 97% sulfuric acid at 25° C. are about 620 and 740 times, respectively, that of isobutane. This greatly increases the difficulty of protecting the catalyst acid from undesirable olefin absorption. We have found, however, that the rate of absorption of olefin may be materially reduced by proper dilution of the olefin and that it is particularly desirable to dilute the olefin feed with the isoparaffin to be used in the reaction as in this way longer catalyst acid life is possible. At the same time it is highly advantageous to provide conditions favorable for high rates of isoparaffin absorption, such as strong acid solutions, and in particular by having large amounts of isoparaffin, preferably in high concentration, present in the reaction zone. Merely having an excess of isoparaffin present is alone not sufficient to insure a long catalyst life and provision should be made for substantially complete reaction of the olefin in order that there may be no accumulation of olefin in the system. We have discovered that, contrary to previously held ideas, the reaction between isoparaffins and olefins to form higher boiling saturated hydrocarbons can be made a relatively rapid one.

Based on these discoveries we have developed an efficient, technically practical method for continuously reacting isoparaffins with olefins which gives long catalyst life and extremely high rates of production per volume of reaction space while insuring high yields of uniformly high quality products. In our process the ratio of isoparaffin to olefin in the reaction zone is advantageously maintained higher than that in the feed. This more favorable reaction condition is achieved by recycling a part of the reacted mixture rich in isoparaffin, but substantially free from olefins, to mix with the feed as it enters the reactor. In our preferred method of carrying out our process we advantageously operate with two stages of dilution of the olefinic feed, first diluting the olefin feed stock with isoparaffin-containing hydrocarbon before bringing it into contact with the catalyst acid and then adding this mixture to recycled reaction mixture of dispersed catalyst and isoparaffin containing hydrocarbon which is substantially olefin-free. In any case we prefer to operate with a high concentration of the isoparaffin which it is desired to react in contact with the catalyst acid and present in excess over the olefin used. By this method of operation and the proper adjustment of contact time, acid strength, temperature and acid to hydrocarbon ratio complete reaction of the olefin is readily achieved and we find it feasible to so operate that in the reactor proper the olefin concentration is so low that it is not measurable by existing analytical methods. To this end, it is highly advantageous to provide thorough, uniform, positive mixing of a small amount of olefin in a large amount of isoparaffin so that no short circuiting or accumulation of olefin anywhere in the system takes place.

While other methods of operation may be used without departing from the spirit of our invention, the accompanying drawing illustrates, diagrammatically, one assembly of apparatus particularly suitable for large scale application of the process of our invention, in which optimum reaction conditions can be readily maintained. In the drawing pipe lines 1 and 2 are supply lines for isoparaffin and olefin containing hydrocarbon, respectively, from sources not shown, which are mixed in line 3. The rate of feed of the resulting mixture may be regulated by adjustment of valve 4. In line 3 the isoparaffin and olefin feed may be diluted with isoparaffin containing hydrocarbon introduced through lines 25 and/or 32. The feed from pipe 3 is introduced into line 5 where it contacts recycled reaction mixture comprising catalyst acid, preferably sulfuric acid, and unreacted isoparaffin. It is highly desirable that the mixing at this point be as thorough and rapid as possible. Line 5 is in communication with positive circulating means such as pump 6 which passes a part of the mixture of hydrocarbon and catalyst by lines 7, 8 and 9 to a means for maintaining the mixture in a dispersed condition until reaction is substantially complete which may take the form of time tank 10 or the like. A branch line 11 leading to cooler 12 permits cooling sufficient of the reaction mixture by indirect heat transfer to a suitable cooling medium, to bring the temperature of the entire mixture to the desired point after reintroduction of the cooled portion via line 13 connecting cooler 12 with line 8. The amount of reaction mixture circulated through the cooler instead of via line 8 may be regulated by inserting a suitable resistance 14 which may take the form of an orifice plate or the like in line 8. The circulating stream of reaction mixture passes by line 9 to a time tank 10 which advantageously may be equipped with perforated plates so spaced that they provide a degree of turbulence sufficient to maintain the desired dispersion of catalyst acid and hydrocarbon throughout the time of resistance of the mixture in the tank although suitably packed towers or coils of pipe of suitable diameter and length or other equivalent means may be used. From the time tank 10 the reaction circulates by line 15 to line 5 where it again contacts incoming isoparaffin and olefin feed from line 3. Before such contact, however, a side stream is withdrawn by line 16 to means for separating immiscible liquids such as stratifier 17 where stratification takes place and the upper, hydrocarbon layer is removed through pipe line 18. The lower, catalyst acid layer is returned to the circulation system by line 19 connecting separator 17 with line 5 at a point on the down stream side of, and advantageously substantially removed from, the point of connection of feed inlet line 3. The proportion of reaction mixture withdrawn to the separator is controlled by placing a definite resistance 23 in the recycle stream and by a throttle valve 22 in the line returning acid phase from the separator. It is helpful in the maintenance of the circulating pump stuffing box to allow this element to operate exclusively on hydrocarbon or on acid phase as it is difficult to provide materials equally resistant to both phases. Thus, a line 24 may be provided whereby a part of the stream of acid from separator 17 can be taken off and used to seal the stuffing box of pump 6. Alternatively, hydrocarbons can be used by directing part or all of the feed from lines 1 and 2 to the pump stuffing box.

It is a feature of the process of our invention that the acid catalyst used is preferably preconditioned before the start of the reaction by being first saturated with olefin-free hydrocarbon, preferably hydrocarbon containing the isoparaffin to be used in the process. To this end, the apparatus, in starting operations, is first charged with isoparaffin containing hydrocarbons, free from olefins, and the required amount of catalyst acid, for example, sulfuric acid of 90% to 110% concentration, is then added. In general, a ratio of about 0.2 to about 2 volumes of acid phase per volume of hydrocarbon phase may be used, although ratios of about 0.4 to about 1.2, such that the hydrocarbon constitutes the continuous phase in the resulting dispersion, are preferred as ease of dispersion is facilitated thereby, but higher and lower ratios may be used; although excessively high acid ratios which result in too great a decrease in the volume of hydrocarbon in the recycle stream are undesirable. With the dispersion of sulfuric acid and isoparaffin hydrocarbon flowing uniformly through the system, valve 4 is opened and the olefinic feed, preferably containing at least an equal molecular amount of isoparaffin and preferably containing an excess of isoparaffin, most preferably at least 3 molecules of isoparaffin per molecule of olefin is admitted through line 3. The rate of feed of reactants is preferably so adjusted with respect to the rate of flow of recycle stream through line 5, that the ratio of isoparaffin to olefin at the point of contact of acid and olefin is of the order of at least 20 to 1 and more preferably is at least 50 to 1. Ratios of about 100 to about 400 to 1 and higher may be used; it being only undesirable to employ such high ratios that the plant capacity is unnecessarily reduced.

In order to obtain high reaction rates, the sulfuric acid should be thoroughly mixed with the hydrocarbons present. The circulation rate should be such that the desired degree of mixing is maintained for sufficient time to allow the reaction of substantially all of the added olefin during one cycle of flow. It is highly desirable that no substantial recycling of unreacted olefin takes place. The proportion of reaction mixture diverted to cooler 12 and the degree of cooling therein are preferably adjusted so as to maintain a temperature of about 0° C. to about 35° C., preferably about 15° C. to 25° C., in time tank 10. One effect of recycling reaction mixture is to so increase the mass of liquid circulating through the time tank that only a small temperature rise results from the heat of reaction and of friction. Such heat can be removed efficiently at any one point and the cooler can be of the most efficient type and can be located in the main circulation stream instead of in a branch thereof as shown in the drawing, the choice of location depending upon the flow rates most suitable for the particular cooler used.

It is not essential to have complete separation of hydrocarbon and acid in separator 17 but it is highly advantageous to prevent removal of acid from the system with the hydrocarbon phase withdrawn through line 18. Should loss of acid occur in this or any other way, e. g. leakage, chemical reaction, etc., make up acid may be added, for example, through valved line 20 connecting line 19 with an acid supply not shown. It is desirable to continuously or intermittently replace a part of the acid in the system, which may be withdrawn through valve controlled line 21, by fresh or suitably purified acid added through line 20, although periodic draining of all the acid from the reactor and its replacement with fresh or purified acid, may also be used. Increased amounts of products boiling higher than the initial reaction product are usually associated with the falling off in conversion rate which is indicative of the desirability of replacing catalyst acid. Emulsification difficulties and sulfur dioxide evolution can be overcome by replacing catalyst acid.

The hydrocarbon phase withdrawn from separator 17 through pipe line 18 is conducted by line 26 to a distillation unit 27 for recovery of reaction product. Although it is not essential to the process of our invention, a part of the withdrawn hydrocarbon phase may advantageously be taken off by line 25 before such distillation and used to dilute the olefin-isoparaffin feed in line 3. In still 27, which may be of the flash distillation type, the higher boiling products formed in the reaction are taken off as bottoms through line 28 while the unreacted hydrocarbon containing isoparaffin is removed by line 29. The unreacted hydrocarbon thus recovered may be returned to the reaction system, preferably with the olefinic feed as by lines 30 and 32. Where inert components are present these may advantageously be removed before returning the isoparaffin content to mix with the olefin feed. In the drawing the removal of inert components having a higher boiling point than the isoparaffin being used in the reaction, for example the removal of normal from isobutane, is illustrated. In such a case the overhead product from still 27 is fed to still 31 from which the isoparaffin is removed by line 32 and returned to pipe line 3 while the inert component or components are withdrawn from the system by line 33. It will be obvious that depending upon the boiling points, relative solubilities, etc. of the isoparaffin and inert material, other distillation methods or extraction or other suitable procedures may be used for removal of the inert material.

The particular combination of operating conditions to be used in any particular case will depend upon the isoparaffin and olefin or mixture thereof to be reacted. In all cases we prefer to operate under sufficient pressure to maintain the reactants in the liquid phase. We also prefer to use acid concentrations which are as high as possible in order to promote absorption of isoparaffin therein. With sulfuric acid catalysts the upper limit of acid concentration depends upon the temperature employed as too high a concentration of acid at too high a temperature leads to undesirable sulfonation reactions and the like. Fuming sulfuric acid at temperatures below 0° C. may be used. The tendency of sulfuric acid catalysts to cause sulfonation may be reduced by the use of phosphoric acid. Solutizers for the isoparaffin being reacted, such as benzene sulfonic acid and the like, may be used with the catalyst acid as may also inorganic salts such as heavy metal sulfates which have a beneficial influence on the reaction. Sulfuric acid of less than about 90% concentration is preferably not used and for the reaction of isobutane with normal butylenes, acid of about 96% to 110% concentration, preferably 98% to 102%, is desirable. Temperatures between 35° C. and —20° C. are suitable. With the preferred 98% to 102% sulfuric acid a temperature of 0° C. to 10° C. is advantageous, higher temperatures being applicable with weaker acid and lower temperatures being desirable with more concentrated acid. The difference in reactivity of different isoparaffins does not appear to be as great as the difference in reactivity of the various olefins. Thus where the same olefin or olefins are used substantially the same reaction conditions may be successfully employed for the reaction of isopentane therewith as when isobutane is used. When isobutylene is substituted for beta-butylene, for example, on the other hand, it is advisable to alter the operating conditions to compensate for the much greater reactivity of the tertiary olefin. We prefer, when using highly reactive olefins to increase the ratio of isoparaffin to olefin used, particularly in the feed mixture to the reactor but also advantageously in the reactor as well. Where propylene is used as one of the reactants due allowance must be made for its different reactivity. When olefinic mixtures such as are obtained in Dubbs' cracking processes are used the conditions should be adjusted with particular reference to the more reactive olefin present. The differences in reactivity of secondary olefins of six or more carbon atoms per molecule are not so pronounced and it has been found satisfactory to react cracked gasoline with isobutane to obtain a saturated gasoline of high anti-knock value by using conditions quite similar to those employed when reacting isobutane with butylenes.

Presence of alcohols, ethers, ketones, etc., which tend to split off $H_2O$ in the presence of $H_2SO_4$, is undesirable because of the diluting effect of such decomposition product on the acid. Likewise nitrogen bases, such as amines, etc. in the feed stock are preferably avoided. We find it convenient to use the spent catalyst acid, preferably after dilution with water, e. g. to about 60 to 75% or lower, to remove such undesirable components from the feed stock but other suitable methods whether of the solvent extraction type or not may also be employed.

The following tables show the advantageous results obtainable by the process of our invention as applied to the reaction of isobutane with butylenes, and the effect of different operating conditions thereon. The reactions were carried out in a bronze turbo mixer of 1160 cc. capacity provided with a cooling coil through which cold acetone was circulated at a sufficient rate to maintain the desired temperature. The mixer was provided with inlet lines for isoparaffin-olefin feed and returned acid and a draw-off line leading to a stratifier from which upper hydrocarbon phase was continuously removed while lower acid phase was taken off by the acid return line. The isoparaffin and olefin for reaction were continuously fed to the reactor under a pressure of about 150 to 200 lbs./sq. in. gauge, at a rate controlled by a thermo flow meter. Hydrocarbon phase was withdrawn from the separator at the same rate and distilled and the reaction product and unreacted hydrocarbon recovered and analyzed. In all cases the acid used as catalyst was saturated with isobutane free from olefin before the start of the run. The effect of premixing the olefin feed with isoparaffin is shown in Table I.

*Table I*

| Exp. No | 22 | 27 | 28 | 36 |
|---|---|---|---|---|
| Mols of isobutane added to the feed per mol of butylene fed | 2.3 | 4.8 | 4.8 | 4.8 |
| Olefin concentration of mixture fed | 13.7% | 14.1% | 14.1% | 14.0% |
| Sulfuric acid catalyst concentration (weight per cent $H_2SO_4$) | 96 | 96.9 | 96.4 | 96.3 |
| Volume ratio of acid to hydrocarbon | 0.7/1 | 0.7/1 | 0.7/1 | 0.7/1 |
| Temperature | 20° | 20° | 20° | 20° |
| Feed rate (cc. of hydrocarbon/min.) | 30/35 | 30/35 | 60/70 | 90/100 |
| Contact time | 20 min | 20 min | 10 min | 7 min |
| Yield as per cent of olefin fed | 148 | 192 | 201 | 183 |
| Volumes of product/volume of acid | 6.75 | 11.5 | 8.75 | 18.5 |
| Percent of product boiling between 24° C. and 132° C.: | | | | |
| Initially | 82 | 93 | 91.5 | 87.5 |
| After 3 vols. of product/vol. of acid | 75 | | | |
| After 6.75 vols. of product/vol. of acid | 31.5 | 91.5 | 89.8 | 86.7 |
| After 8.75 vols. of product/vol. of acid | | 90.75 | 86 | 86 |
| Condition of catalyst at end of test | Almost completely spent. | Very active, apparently not more than half its effective life utilized. | Very active, capable of producing about 9 more vols. of product. | Substantially although still not completely spent. |

These results show the advantage of feeding a high ratio of isoparaffin to olefin, it being apparent that doubling the ratio of isobutane to butylene in the feed under otherwise similar conditions not only greatly increases the yield (from 6.75 to an estimated 23 volumes of product per volume of acid) and gives better yields (192% compared with 148% based on the amount of olefin used) of better quality products but also makes feasible production rates not feasible when the lower isoparaffin to olefin ratios are used. The importance of having a high ratio of isoparaffin to olefin in the feed is clearly brought out by a comparison of the figures in columns one and four of Table I which are results of tests in which the ratios of isoparaffin to olefin in the reactor were approximately the same, the lower isoparaffin-olefin ratio in the first case being nearly compensated for by the lower recycle ratio of the latter. We consider it particularly advantageous to maintain a high concentration, suitably at least 40% and more preferably 50% or higher, of the isoparaffin or isoparaffins being reacted, in the hydrocarbon phase of the reaction mixture.

In Table II the effect of acid concentration and temperature on the reaction of isobutane with a butylene mixture containing beta-butylene as the predominating olefin together with smaller amounts of iso and alpha-butylene, is shown.

*Table II*

| Exp. No. | 34 | 29 | 33 | 35 | 30 | 31 | 37 |
|---|---|---|---|---|---|---|---|
| Mols of isobutane added to the feed per mol of butylene fed. | 4.9 | 4.8 | 4.9 | 4.9 | 4.9 | 4.9 | 4.8 |
| Olefin concentration of mixture fed | 10.9 | 11.3 | 10.9 | 10.9 | 11.0 | 10.9 | 11.1 |
| Sulfuric acid catalyst conc. (weight per cent $H_2SO_4$) | 92.1% | 94 | 95.8 | 100 | 96.7 | 98 | 100 |
| Volume ratio of acid to hydrocarbon | 0.7/1 | 0.7/1 | 0.7/1 | 0.7/1 | 0.7/1 | 0.7/1 | 0.7/1 |
| Temperature | 20° C. | 20° C. | 20° C. | 20° C. | 20° C. | 20° C. | 10° C. |
| Feed rate (cc. of hydrocarbon/min.) | 30–55 | 30–35 | 30–35 | 30–35 | 60–70 | 60–70 | 30–35 |
| Contact time, min | 20 | 20 | 20 | 20 | 10 | 10 | 20 |
| Yield as per cent of olefin fed | 112 | 153 | 180 | 212 | 180 | 222 | 216 |
| Volumes of product/volume of acid | 1.67 | 10.32 | 16.32 | 9.43 | 9.70 | 12.96 | 9.97 |
| Per cent of product boiling between 24° C. and 132° C.: | | | | | | | |
| Initially | 29.1 | 80.5 | 89.5 | 95 | 80 | 90.7 | 95.2 |
| After 3 vols. of prod./vol. of acid | | 80.5 | 87.8 | 94.3 | 80.2 | 89.6 | 94.7 |
| After 6.75 vols. of prod./vol. of acid | | 69.1 | 84.0 | 91.3 | 72.4 | 87.7 | 94.3 |
| After 8.75 vols. of prod./vol. of acid | | 57.5 | 80.7 | 86.2 | 59.6 | 86.2 | 94.0 |
| End | 39.2 | 30 | 46.7 | 95.9 | 53.2 | 80.1 | 92.0 |
| Condition of catalyst at end of test | Spent | Spent | Spent | Still active | Spent | Still active | Still active |

These results bring out the desirability of using strong acid and suppressing sulfonation by operating at low temperatures. They also show the extremely long life of the catalyst when our method of operation is employed. The high production rates obtainable by our process are shown; for example, by the test reported in the last column of Table I, where the rate of production of higher boiling hydrocarbon was 1.01 volumes per hour per volume of reaction space.

It will thus be evident that our process for reacting isoparaffins with olefins offers many advantages particularly in efficiency of operation and economy of catalyst acid. It not only provides a simple method, recycling of reacted mixture, for maintaining a high ratio of isoparaffin to olefin but also permits of thorough mixing and the maintenance of the reaction mixture in a highly dispersed condition, at which the rate of reaction is high, for sufficient time to allow the reaction of the olefin to go to completion. Furthermore, the power required for maintaining such dispersion may be supplied by a pump of high efficiency in which the wear, which is a function of the power losses within the pump, is low, the power imported by the pump to the circulating mixture being converted into dispersion effect in the reactor, e. g. at the perforated plates of the time tank, and also advantageously in substantial amount at the juncture of lines 3 and 5. Our system provides ready control of the volumetric ratio of catalyst acid and hydrocarbon phases, since by the removal of product from the system without removing acid a definite constant quantity of the latter is maintained in the system. In this way operation in the preferred range of continuous hydrocarbon phase where greater opportunity for diffusion of reactants exists is readily maintained. In our preferred form of reaction system the feed inlet and product outlet points are separated by time tank elements or pipe coils or the like, the feed most preferably entering the recycle stream directly after the point of offtake of the separator branch, and consequently the opportunity for short circuiting is definitely limited. Also the primary mixing is confined to a limited region in which the mixing is positive, easily controlled, rapid and thorough. It provides a simple method for maintaining a high concentration of isoparaffin in the reaction mixture whereby the catalyst acid may be kept substantially saturated with isoparaffin and so protected from undesirable reaction with the olefin. It also provides for a low concentration of primary reaction product in the reaction mixture which makes possible higher yields of such desirable products by reducing the opportunity for further reaction between the product and more olefin. All of these factors contribute to make our new process highly efficient and economical and make its products superior in quality.

While we have described our invention in a detailed manner and illustrated suitable means of carrying it out it will be understood that variations may be made not only in regard to the isoparaffins and olefins which may be reacted and the catalyst acid used therewith but also with respect to the details of operation used. For example, while addition of isoparaffin to the olefinic feed has been described as our preferred method of operation, it is also possible to make such addition to the reaction mixture separately so as to maintain therein the desired high concentration of isoparaffin. Also, instead of using the process for the primary production of relatively low boiling isoparaffins by reaction of one molecule of olefin with one molecule of isoparaffin, higher boiling products may be prepared by maintaining such a high concentration of such primary products in the mixture that their further reaction with another molecule of olefin is promoted. While emphasis has been placed on our preferred method of continuous operation it will be obvious that many features of our invention are also highly advantageous when operating intermittently or batch-wise. Again where return of unreacted hydrocarbon containing normal paraffins substantially inert under the conditions of our reaction has been described, it will be understood that in many cases such compounds can be advantageously isomerized, for example by passing their vapors over aluminum chloride catalyst at an elevated temperature, either after separation of such compounds in still 31 or not, before such return to the system, and the resulting isoparaffins used in our process. Still other modifications may be made in the process of our invention; consequently no limitations other than those imposed by the scope of the appended claims are intended.

This application is a division of our copending application Serial No. 245,714, filed December 14, 1938, now Patent No. 2,435,402.

We claim as our invention:

1. Process of manufacturing high anti-knock motor fuel constituents boiling in the aviation gasoline boiling range from cracking still gases containing a mixture of isoparaffin, normal paraffin, and olefin, which comprises charging said gaseous mixture to a reaction zone wherein isoparaffin is alkylated with olefin by contact with an alkylation catalyst comprising sulfuric acid of alkylating concentration, simultaneously maintaining the concentration of isoparaffin to be alkylated in the hydrocarbon phase of said reaction zone above 50% by liquid volume of the hydrocarbons, maintaining the ratio of isoparaffin to olefin at the point where the olefin initially contacts the catalyst above 100 to 1, and maintaining a high degree of contact between the acid and hydrocarbon phases to produce a high yield of high anti-knock motor fuel hydrocarbons boiling in the aviation gasoline boiling range.

2. Process of manufacturing high anti-knock motor fuel constituents boiling in the aviation gasoline boiling range from isobutane and butene which comprises alkylating isobutane with butene by contact with an alkylation catalyst comprising sulfuric acid of alkylating concentration, simultaneously maintaining the concentration of isobutane in the hydrocarbon phase in said reaction zone above 50% by liquid volume of the hydrocarbons, maintaining the ratio of isobutane to butene at the point where the butene initially contacts the acid catalyst above 100 to 1, and maintaining a high degree of contact between the acid and hydrocarbon phases to produce a high yield of high anti-knock motor fuel hydrocarbons boiling in the aviation gasoline boiling range.

3. In a process of manufacturing high anti-knock motor fuel constituents boiling in the aviation gasoline boiling range from cracking still gases comprising a mixture of isoparaffin, normal paraffin and olefin, wherein said mixture is charged to a reaction zone in which the isoparaffin is alkylated with said olefin by contact with an alkylation catalyst comprising sulfuric acid of alkylating concentration while maintaining the ratio of said isoparaffin to olefin at least 50 to 1 at the point where the olefin initially contacts the catalyst and maintaining a high degree of contact between the acid and hydrocarbon phases, the improvement which comprises simultaneously maintaining the concentration of the isoparaffin to be alkylated in the hydrocarbon phase of said reaction zone above 60% by liquid volume of the hydrocarbons to produce a high yield of high anti-knock motor fuel hydrocarbons boiling in the aviation gasoline boiling range.

4. In a process of manufacturing high anti-knock motor fuel constituents boiling in the aviation gasoline boiling range from isobutane and butene, wherein a mixture of isobutane, normal butane and butene is contacted with an alkylation catalyst comprising sulfuric acid under alkylation conditions while maintaining the ratio of isobutane to butene at the point where the butene initially contacts the acid catalyst at least 50 to 1 and maintaining a high degree of contact between the acid and hydrocarbon phases, the improvement which comprises simultaneously maintaining the concentration of isobutane in the hydrocarbon phase in the reaction above 60% by liquid volume of the hydrocarbons.

5. In a process of alkylating an isoparaffin with an olefin in the presence of an alkylation catalyst acid comprising sulfuric acid of alkylation concentration wherein the alkyl acid sulfate concentration in the catalyst is maintained sufficiently low to produce a high quality product by effecting a sufficiently high degree of mixing of hydrocarbon and acid catalyst phases, thus producing a sufficiently large surface of contact between said hydrocarbon and acid catalyst phases while simultaneously maintaining the molecular ratio of isoparaffin to be alkylated to olefin at the point where olefin initially contacts the acid catalyst above 100 to 1, the improvement which comprises maintaining the concentration of the isoparaffin to be alkylated in the hydrocarbon phase of said reaction zone above 60% by liquid volume of the hydrocarbons.

6. In a process of alkylating isobutane with butene by means of an alkylation catalyst acid comprising sulfuric acid of alkylation concentration wherein the butyl acid sulfate concentration in the catalyst is maintained sufficiently low to produce a high quality product by effecting a sufficiently high degree of mixing of hydrocarbon and acid catalyst phases, thus producing a sufficiently large surface of contact between said hydrocarbon and acid catalyst phases while simultaneously maintaining the molecular ratio of isobutane to butene at least 50 to 1 at the point where the butene initially contacts the acid catalyst, the improvement which comprises maintaining the concentration of isobutane in the hydrocarbon phase in the reaction zone above 60% by liquid volume of the hydrocarbons.

7. In a process of alkylating an isoparaffin with an olefin in the presence of an alkylation catalyst acid wherein a mixture of isoparaffin, normal paraffin and olefin of at least three carbon atoms per molecule is charged to a reaction zone in which isoparaffin is alkylated with olefin by contact with said catalyst acid while maintaining the ratio of said isoparaffin to olefin at the point where the olefin initially contacts the catalyst above 100 to 1 and maintaining a high degree of contact between the acid and hydrocarbon phases, the improvement which comprises simultaneously maintaining the concentration of the isoparaffin to be alkylated in the hydrocarbon phase of said reaction zone above 50% by liquid volume of the hydrocarbons.

8. In a process of alkylating isobutane with a butene wherein a mixture comprising isobutane, normal butane and a butene is contacted with an alkylation catalyst acid under alkylation conditions while maintaining the ratio of isobutane to butene at the point where the butene initially contacts the acid catalyst at least 50 to 1 and maintaining a high degree of contact between the acid and hydrocarbon phases, the improvement which comprises simultaneously maintaining the concentration of the isoparaffin to be alkylated in the hydrocarbon phase of said reaction zone above 50% by liquid volume of the hydrocarbons.

SUMNER H. McALLISTER.
EDWIN F. BULLARD.

No references cited.